United States Patent

[11] 3,547,480

| [72] | Inventor | Bruce K. Ward |
| | | 2904 Virginia Ave., St. Louis Park, Minn. |
| [21] | Appl. No. | 746,447 |
| [22] | Filed | July 22, 1968 |
| [45] | Patented | Dec. 15, 1970 |

[54] EXPANDABLE AUTO CAMPER
10 Claims, 10 Drawing Figs.

| [52] | U.S. Cl. | 296/23, 296/99 |
| [51] | Int. Cl. | B60p 3/34 |
| [50] | Field of Search | 296/23, 26, 27, 99 |

[56] References Cited
UNITED STATES PATENTS

| 3,403,935 | 10/1968 | Spradling | 296/23 |
| 1,476,051 | 12/1923 | Cassell | 296/23 |
| 3,475,048 | 10/1969 | McNamee | 296/23 |

FOREIGN PATENTS

| 1,320,238 | 1/1963 | France | 296/23 |

*Primary Examiner*—Philip Goodman
*Attorney*—Burd, Braddock & Bartz

ABSTRACT: An expandable camper mountable on an automobile having an open top body. The camper has an open bottom permitting full concurrent use of the interior of the camper and the passenger compartment of the automobile as if the camper is an extension of the body of the automobile. The camper is mounted on the auto body by releasable locks. Rear wheels and front legs support the camper when removed from the automobile. The camper has expandable folding side portions, folding front wall and a folding floor to provide an enlarged self-contained structure.

INVENTOR.
BRUCE K. WARD
BY
Burd, MacEachron, Braddock,
Bartz & Schwartz
ATTORNEYS

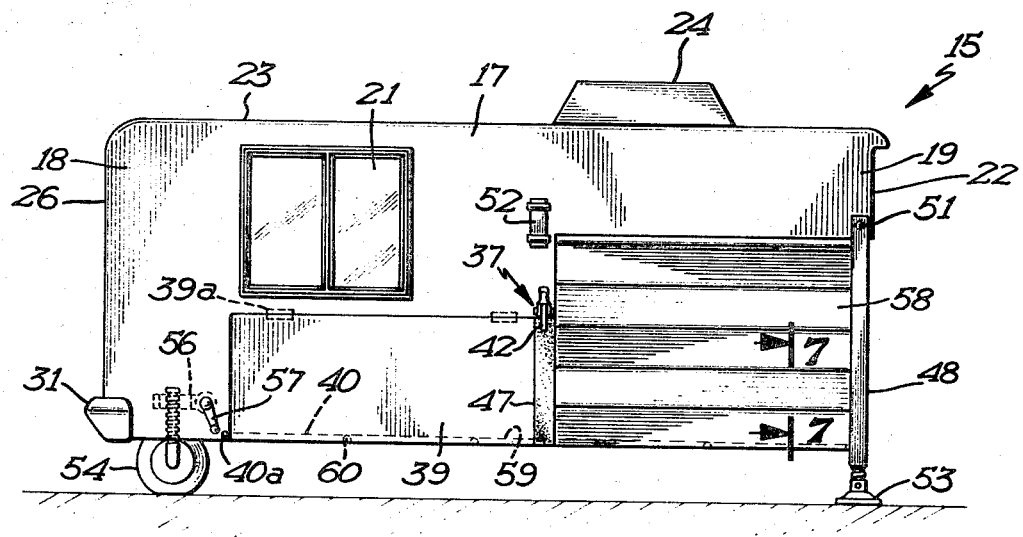
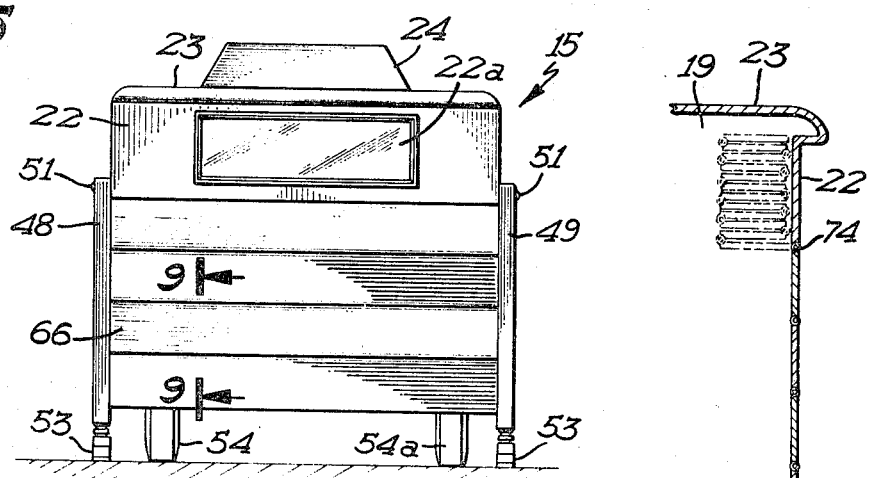
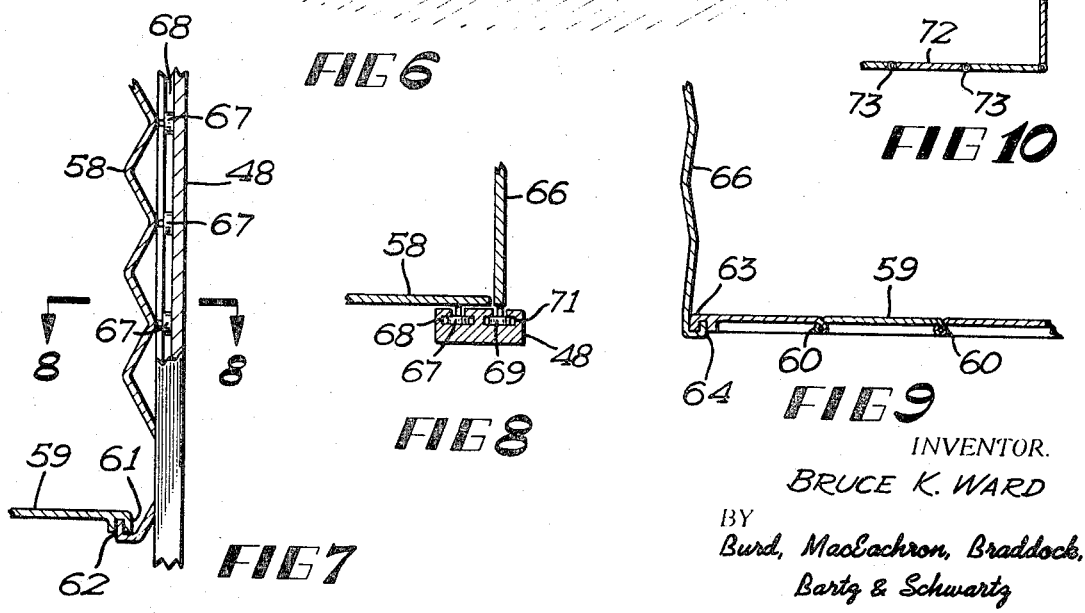

3,547,480

EXPANDABLE AUTO CAMPER

BACKGROUND OF INVENTION

Campers have been built to fit on the top and rear portions of the pickup trucks and automobiles. These structures are self-contained units usable separately from the passenger compartment of the automobile. In transit, the campers are merely storage units. Examples of these campers are shown in the U.S. Pats. to Zentner, No. 3,185,518; Davis et al. No. 3,097,400; and Henson, No. 3,337,259. These structures are removably mounted on an automobile, as a station wagon, and have expandable sidewalls to provide enlarged self-contained camping units.

SUMMARY OF INVENTION

The invention relates to a traveling camper used in association with a passenger automobile having a body with an open top, as a convertible. The camper has a housing enclosing the top of the automobile. A portion of the bottom of the housing is open and located over the open top of the body of the automobile so that there is unobstructed access between and full concurrent use of the passenger compartment of the automobile and the interior of the housing. The camper is an extension of the body of the automobile and is completely functional while attached to the automobile. Releasable fastening means are used to attach the camper to the body of the vehicle. The rear section of the camper is supported on wheel means connected to vertically movable jacks. The jacks are operable to retract the wheels up into the housing in the transport position and lower the wheels so that the housing can be moved apart from the automobile. Legs used to support the front of the housing also function as cornerposts for the expandable sidewalls and front walls when the camper is used as a stationary unit.

IN THE DRAWINGS

FIG. 5 is a side view of the camper expanded at a campsite;

FIG. 6 is a front elevational view of the camper of FIG. 5;

FIG. 7 is an enlarged sectional view taken along the line 7—7 of FIG. 5;

FIG. 8 is a sectional view taken along the line 8—8 of FIG. 7;

FIG. 9 is a sectional view taken along the line 9—9 of FIG. 6; and

FIG. 10 is a view similar to FIG. 9 of a modified front wall and floor.

Figure 1:
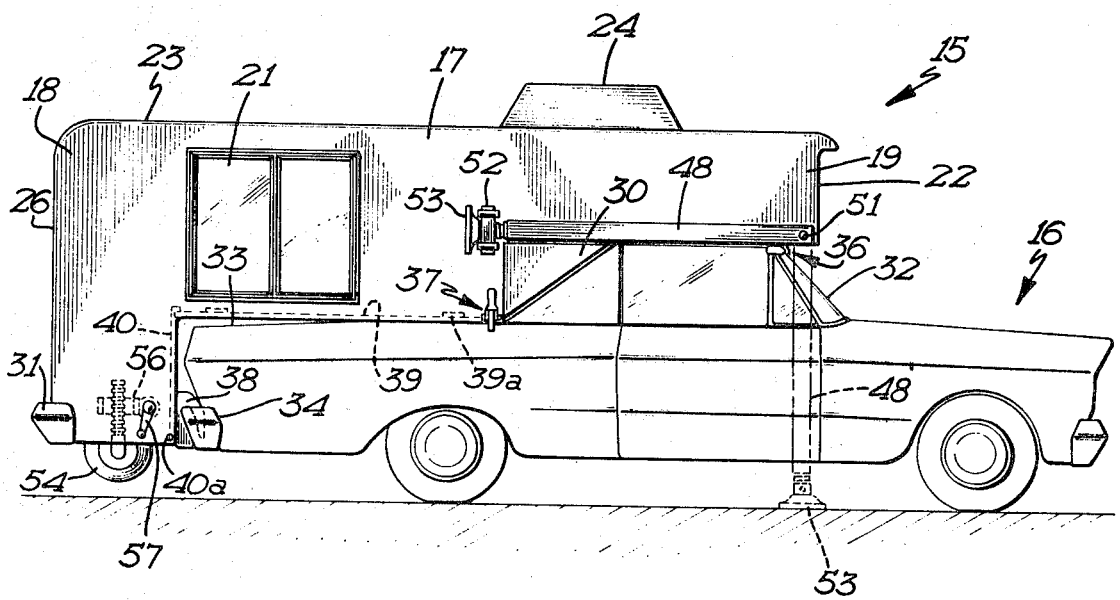
FIG. 1 is a side elevational view of the expandable auto camper of the invention mounted on an automobile.

Referring to the drawings there is shown in FIG. 1 a camper indicated generally at 15 mounted on an automobile 16 shown as a convertible with the top in the down position. The camper has a housing 17 enclosing the top of the automobile having a mid or body section, a rear section 18 extended downwardly adjacent the rear of the back of the automobile and a front section 19 extended above and forwardly of the windshield 32.

Figure 2:
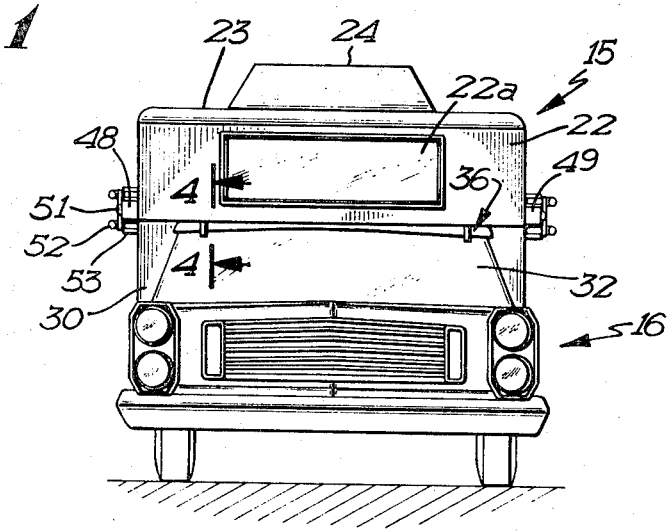
FIG. 2 is a front elevational view of FIG. 1.

The housing 17 of the camper 15 is generally L-shaped with the rear section 18 extended downwardly adjacent the back of the rear of the automobile. The sides of the housing have side windows 21 and the front wall 22 has a transverse window 22a shown in FIG. 2. The roof 23 of the housing 17 supports an air conditioner 24. The air conditioner 24 can be replaced with a roof window providing a skylight for the camper and head room so that a person can stand in the automobile.

Figure 3:
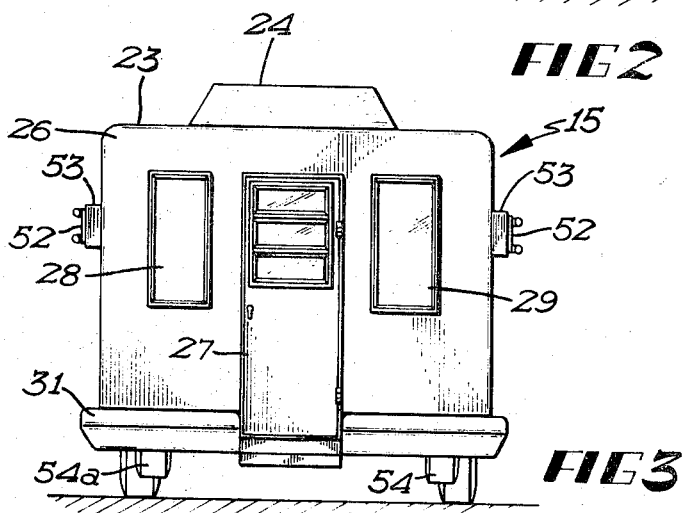
FIG. 3 is a rear elevational view of FIG. 1.

Referring to FIG. 3, the rear or back wall 26 of the housing has a central door 27 and side windows 28 and 29. A two-piece bumper 31 is secured to the lower rear of the back wall.

The camper is supported on the top of the windshield 32, the forward portion of the trunk 33, and the rear bumper 34. A releasable front lock or fastener 36 attaches the front section 19 of the housing to the top support of the windshield. The lock 36 can operate in a manner similar to the attaching lock of the convertible used to connect the top to the windshield. The central portion of the housing is attached to the auto body with a releasable lock 37. The rear section 18 of the housing is supported on the bumper 34 with releasable connectors 38 comprising a plurality of inverted U-shaped clamps which extend over the bumper 34. Other types of supports and locks can be used to mount the camper on the automobile.

The portion of the housing that extends over the trunk 33 is closed with pivotally mounted sidewalls 39 which form a floor for the middle section of the housing. The front of the rear section 18 is closed with a floor 40 hinged to the bottom by hinges 40a to the bottom of section 18. The floor 40 cooperates with the rear edge of the floor 39 to seal the interior of the housing. In the expanded position as shown in FIG. 5, the wall 40 pivots to a forward horizontal position to form the floor for a portion of the midsection of the housing.

Figure 4:
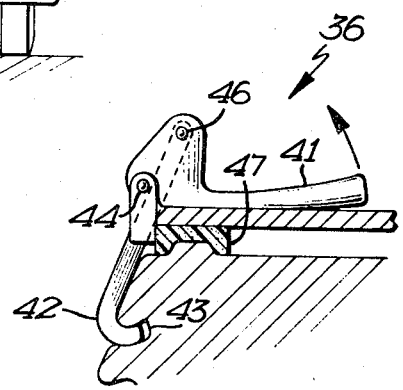
FIG. 4 is an enlarged sectional view taken along the line 4—4 of FIG. 2 showing a releasable lock for connecting the camper to the automobile.

Referring to FIG. 4, the releasable lock 36 comprises an arm 41 pivotally connected to a hook 42 having a lower end extended into a hole 43 in the body of the vehicle or top support for the windshield. The forward end of the arm 41 is connected to the portion of the floor 39 with a pivot 44. The upper end of the hook 42 is connected to the enlarged portion of the arm 41 with a pivot 46. Interposed between the forward edge of the floor 39 and the body of the vehicle is a transverse resilient strip 47 which functions as a seal and protector of the finish of the car. The lock will remain in the lock position as the pivot 46 is in an overcenter position relative to the pivot 44 forcing the end of the arm 41 in the downward direction against the floor 39. A pair of releasable locks 37 are used to attach the housing to the midportion of the vehicle. In the same manner, a pair of similar releasable locks 36 are used to attach the front of the housing to the top of the windshield.

As shown in FIG. 6, a pair of pivotally mounted front legs 48 and 49 are used to support the front of the housing when the camper is used as a self-contained unit and detached from the automobile. The upper ends of each leg connected with a pivot 51 to the sides of the front section 19 pivot to a longitudinal rearward position shown in FIG. 1. Latches 52 are used to hold the legs 48 and 49 against the sides of the housing. Threadably mounted on the lower ends of the legs 48 and 49 are extensible feet 53 which provide ground supporting surfaces as well as permit the length of the legs to be extended to raise the housing from the vehicle. The extensible feet 53 may be manually turned or moved by electrically operated mechanism to automatically extend and contract the legs.

Mounted on the lower rear portion of the housing are a pair of wheel assemblies 54 and 54a for supporting the rear of the housing. Jack mechanisms 56 mount the wheels in the housing. In use the jack mechanisms 56 are operable to raise and lower the wheel assemblies so that they can be moved upwardly to a transport position and lowered to provide support and raise the housing from the automobile. Each jack mechanism has a removable crank handle 57 to manually operate the jack mechanism to raise or lower the associated wheel assembly. The wheel assemblies permit the movement of the camper to a new location without mounting the camper back on the automobile. The wheel assemblies 54 and 54a carry the a majority of the weight of the camper whereby the camper may be easily moved.

As shown in FIG. 5, the camper 15 is in its expanded stationary position having downwardly extended front sidewalls 58 and an expanded folding floor 59. Referring to FIG. 9, the floor 59 comprises a plurality of transverse panels hinged in side-by-side relationship by hinges 60 so that it may be folded to a storage position. As shown in FIG. 7, opposite sides of the floor 59 have downwardly open channels 61 which cooperate with upwardly projected ribs 62 along the bottom of the sidewalls 58. The opposite side of the camper has a similar sidewall which cooperates with a channel on the opposite ends of the floor sections.

As shown in FIG. 9, the front or forward panel of the floor 59 has a transverse downwardly open channel 63 which cooperates with an upwardly directed transverse rib 64 along the bottom of an expandable front wall 66. In this manner, the floor is held along its periphery with the sidewalls 58 and front wall 56.

The wall section 39 pivots in the downward direction on the hinges 39a and cooperates with the floor 59 with a channel and rib structure similar to the structure shown in FIG. 7. A wall section similar to section 39 is hinged to the opposite side of the housing. The rear panel of the floor 59 has a cooperating channel and rib structure (not shown) with the forward section of the wall 40 to provide a continuous floor from the front to the rear of the camper. The floor panels 59 may be made of sheet material, as lightweight metal or plywood, having sufficient strength to support a person inside of the camper. The sidewalls 58 and front walls 56 may be expandable fabric, canvas, plastic, aluminum or like material which is waterproof yet flexible so that it can be folded into the forward section 19 of the housing.

The forward ends of the sidewalls 58 have outwardly directed guides 67 which are slidably mounted in upright T-shaped channels 68 on the legs 48 and 49. In this manner, the legs 48 and 49 are retained in their upright positions and support the sidewalls 58. The front wall 56 has outwardly directed guides 69 on its opposite ends cooperating with second upright T-shaped channel 71 in the legs 48 and 49 so that the front wall 66 is held in an upright position by the legs 48 and 49. Each guide 67 and 69 has an enlarged head located in the T-shaped channels holding the sidewall and front wall in assembled relation with the legs 48 and 49 so that the walls 58 and 56 cooperate to retain the legs in their upright positions.

Referring to FIG. 10, there is shown a modified structure for the front wall and floor comprising a foldable floor 72 comprised of a plurality of transverse panels hinged at 73 along opposite adjacent sides. The upper panel is attached by a pivot 74 to the lower edge of the front wall 22 so that the floor is foldable in a forward direction and stored in the front section 19 of the housing under the roof 23. The weight of the floor panels is stored centrally of the automobile thereby reducing the rear load on the automobile.

In use, the camper 15 is mounted on the top of the convertible with the floor portions 39 folded in the up horizontal position to close the bottom of the midsection 17 of the housing. The wall member 40 is pivoted to an upright position cooperating with the rear edge of the floor sections 43. The floor 59 can be folded in a side-by-side relation and stored in the rear or front of the housing. Floor 59 can also be expanded and attached to the sidewalls to close the bottom of the housing when it is mounted on the automobile. Also floor 59 can be used to close the bottom of the housing when the camper is stored. The U-shaped clamps 38, mounted on the vehicle bumper 34, support the rear of the housing. The wheel assemblies 54 and 54a are retracted in their up position so that they do not engage the ground. The wheel assemblies can be used as additional supports when the camper is mounted on the automobile. The midportion and forward portion of the camper are releasably locked to the vehicle body by locks 36 and 37. The passenger compartment of the automobile is in communication with the interior of the camper whereby the camper can be used without removing it from the vehicle and can be used during travel.

To remove the camper from the automobile, the locks 36 and 37 are released. The legs 48 and 49 are moved to the upright positions and elevated to raise the housing from the vehicle. The rear wheel assemblies 54 and 54a are lowered to the ground to raise the rear of the housing to release the U-shaped clamps 38 from the rear bumper. The automobile can now be driven from under the camper to be used for excursions, refreshments and sightseeing trips without the camper.

To expand the camper, the floor members 39 are pivoted to the upright positions to extend the sides of the housing. The upright rear wall 40 is pivoted downwardly thereby holding the sidewalls in their upright positions. The front sidewalls 58 are then expanded to enclose the front section of the housing. The expandable floor 59 is then mounted on the front wall 66 and sidewalls 58 to enclose the entire floor of the camper. The rear door is used to provide an entrance into the camper. To remove the camper to another location, the front section of the camper can be raised to roll the camper on the wheel assemblies 54 and 54a to the new location.

While there has been shown and described a preferred embodiment of the invention, it is to be understood that various changes, additions, substitution of materials and locking and jacking mechanisms may be made by those skilled in the art without departing from the spirit of the invention. The invention is defined in the following claims.

I claim:

1. A camper removably mounted on a convertible type automobile without changing the body of the automobile for concurrent use with the automobile and removable from the automobile for placement in a site as a complete enclosed shelter comprising in combination: a convertible type automobile having a conventional body with a passenger compartment having an open top, a housing having a rear section and an open bottom portion, said open bottom portion of the housing being about the same size as the open top of the body so that there is concurrent use of the passenger compartment of the automobile and the interior of the housing when the housing is mounted on the automobile, and releasable fastening means to mount the housing on the top of the automobile with the rear section located adjacent the rear of the automobile and the open bottom portion of the housing in general alignment with the open top of the body, said housing having permanent sidewalls and expandable sidewalls joined to the permanent sidewalls, an expandable front wall, and a removable floor attachable to lower portions of the expandable sidewalls and front wall, said sidewalls, front wall, and floor expanding the interior size of the housing and enclosing the open bottom portion of the housing when the housing is removed from the automobile.

2. The camper of claim 1 wherein the expandable sidewalls each have a first pivotally mounted sidewall and a second extendable sidewall.

3. The camper of claim 1 wherein said housing has an expandable front wall, said folding floor cooperating with the expandable front wall.

4. The camper of claim 1 wherein said foldable floor has connector means for attaching the floor to the expandable sidewalls.

5. The camper of claim 1 including upright legs for supporting the front section of the housing, said legs and expandable sidewalls having coacting means connecting the sidewalls to the legs.

6. The camper of claim 5 wherein said housing has an expandable front wall, said legs and expandable front wall having coacting means connecting the front wall to the legs.

7. The camper of claim 1 including wheel means adjacent the rear section of the housing, and means mounting the wheel means on the rear section in selected vertical positions whereby the wheel means can be raised and lowered relative to the housing.

8. A camper removably mountable on a convertible type automobile for concurrent use with the automobile without changing the body of the automobile and removable from the automobile for placement in a site as a complete enclosed shelter comprising in combination: an automobile having a conventional convertible body with a passenger compartment having an open top and a trunk portion located rearwardly from the passenger compartment, a housing having upright sidewalls, a roof, an upright rear wall, an opening in the bottom portion thereof, and a floor portion covering the trunk portion of the automobile, said opening in the bottom portion of the housing being about the same size as and located in general alignment with the open top of the body so that there is concurrent use of the passenger compartment of the automobile and the interior of the housing when the housing is mounted on the automobile, said housing having permanent sidewalls and expandable sidewalls, an expandable front wall, said floor portion forming part of the expandable sidewalls, and a removable floor attachable to lower portions of the expandable sidewalls and front wall, said sidewalls, front wall and floor expanding the interior size of the housing and enclosing the open bottom portion of the housing when the housing is removed from the automobile, releasable fastening means to mount the housing on the body of the automobile so that the passenger compartment of the automobile is in communication with the interior of the housing, wheel means adjacent the rear section of the housing, and means mounting the wheel means on the rear section of the housing to support the housing when removed from the automobile.

9. The camper of claim 8 wherein at least one portion of the floor is movable to an upright position to form an extension of the sidewall of the housing.

10. The camper of claim 8 including upright legs for supporting the front section of the housing, said legs, expandable said sidewalls and expandable front wall having coacting means connecting the sidewalls and front wall to the legs.